June 20, 1933.  J. S. TAYLOR  1,915,075
PLASTIC TUBING
Filed Aug. 29, 1930

J. S. Taylor INVENTOR.
BY Harold A. Kingsbury
ATTORNEY

Patented June 20, 1933

1,915,075

UNITED STATES PATENT OFFICE

JOHN S. TAYLOR, OF NEW YORK, N. Y., ASSIGNOR TO DU PONT VISCOLOID COMPANY, OF WILMINGTON, DELAWARE, A CORPORATION OF DELAWARE

PLASTIC TUBING

Application filed August 29, 1930. Serial No. 478,667.

This invention relates to seamless tubing of plastic material, such for example as pyroxylin plastic. It has heretofore been proposed to make such tubing in various ways, as by extrusion and by molding sheet plastic about a mandrel. While presenting various other objections, one of the major objections to making plastic by the extrusion method, is that the extruding of the stock destroys the delicate mottling, which it is often desired to have the plastic present. Previous attempts to make tubing by molding the plastic about a mandrel in a die have had the major difficulty that it was not possible to fully and completely irradicate the longitudinal seam in the tubing formed along the line where the facing edges, of the plastic sheet wrapped around the mandrel, meet. In these previous methods embodying molding a sheet about a mandrel in a die, manipulation of the plastic was such that, upon the closing together of the halves of the die, the mating edges of the plastic were somewhat crowded away from each other, and much less were they crowded towards each other. I have now found that this feature, embodied in such previous processes, was, in fact, the major fault of such processes, and the major reason why tubing of high quality could not be satisfactorily produced thereby. That is to say, the tubing had a seam which, whether evident to casual inspection or not, was in all cases present and resulted in a tubing which could not properly withstand strains and crushing forces tending to separate the same.

I have now devised a process whereby tubing of the molded type may be produced without seam or weakness along the line of jointure between the mating edges of the plastic sheet from which the tubing is formed, and I have further devised a tubing free from the flaws and weaknesses mentioned.

One object of the invention is to provide a process whereby molded tubing may be produced free from lack of strength and flaws due to a longitudinal seam therein. A further object is to provide a tubing which shall be substantially without a longitudinal seam, and the weaknesses and flaws incident to such a seam, although such tubing is made by a process embodying molding a sheet of plastic about a mandrel in a die. To these ends, and also to improve generally on processes and tubing of the general character indicated, my invention consists in the various matters hereinafter described and claimed.

Figure 1:
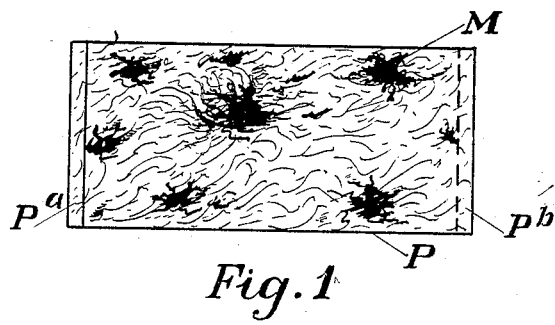
Figure 2:
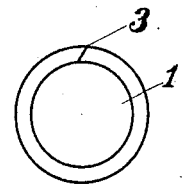
Figure 3:
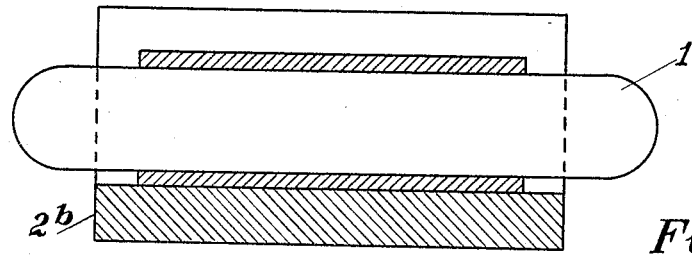
Figure 4:
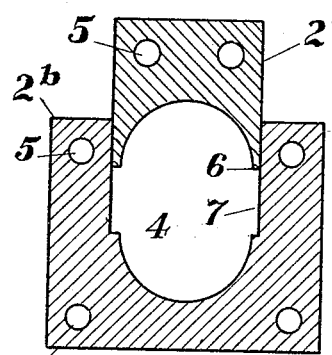
Figure 5:
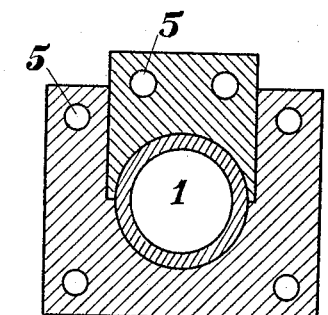
Figure 6:
Figure 7:
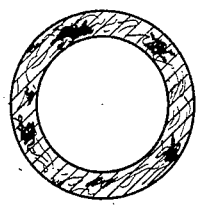

Without restricting the invention thereto, it is described with more particular reference to the accompanying drawing wherein Fig. 1 is a plan view of a sheet of plastic stock for the making of a tube; Fig. 2 is an end view of the sheet laid about the mandrel; Fig. 3 is a longitudinal diametrical cross-section of the mandrel, and sheet, laid in a die-half ready for pressing; Fig. 4 is a cross-sectional view of the general type of die which is used in the pressing; Fig. 5 is a cross-sectional view of the mold or die illustrated in Fig. 4, after the mold or die has closed, and illustrating the condition of the plastic therein; Fig. 6 is a side view to a somewhat different scale of a finished tube, and Fig. 7 is an enlarged cross-sectional view thereof.

In general accordance with the invention, the plastic sheet, laid around a mandrel, is pressed under such conditions, e. g. in a die or mold of such character, that the stock, of which there is a small excess, cannot flow radially away from the body of the stock. Instead, the stock is crowded circumferentially toward the joint or seam, where the opposed edges of the sheet of stock meet. The result is that the stock at the seam is thoroughly mixed, intermingled, and, in practical effect, autogeneously welded. This gives a tube which, in practical effect, is entirely without a longitudinal seam or joint, and is of uniform composition and strength throughout, except that it possibly may have a somewhat greater strength at the joint than it has throughout its mass in general; but this is not to indicate that the tube is of less than normal or standard strength throughout its mass in general.

Referring now to the drawing, the production of the tube may be carried out in detail as follows, it being understood that the detailed description is by way of example merely, and not by way of limitation. A sheet of plastic P, say pyroxylin plastic such, for example, as pyralin, still containing a relatively large amount of volatile solvent (denatured alcohol), the composition being say (parts by weight), pyroxylin 72, camphor 22, solvent 6, and if desired having a mottle M therein, is used for making the tube. The sheet may be prepared in any of the usual ways of the art, as by working together on the rolls masses of plastic, each of desired color, for example, black and red, and cake pressing and sheeting to give a sheet of any desired thickness and size, having the mottle extending thereover and through the thickness thereof. The sheet P is placed about a mandrel 1 of suitable diameter, and the sheet, thus held on the mandrel is introduced into a mold or die designated generally as 2, and the die-halves 2$^a$ and 2$^b$ closed together, whereby the sheet is formed into a unitary whole. The opposed edges of the sheet may be initially brought together before the sheet is placed about the mandrel, or when placing the sheet about the mandrel, or the initial movement of the die may be relied upon for bringing the edges together.

In particular accordance with the invention the die-halves fit the one within the other, as illustrated in Fig. 4, this construction entirely precluding the escape of stock from the periphery of the embryo tube. Instead of the stock thus escaping, the action in the die is to compact the stock throughout, and particularly, to compact it at the meeting point 3 of the edges of the sheet. As will be understood by those skilled in the art, and as illustrated with respect to the lower die-half 2$^b$, in Fig. 3, the die-halves are open at their ends to permit longitudinal flow. As will be plain, plastics of the usual and general compositions used for tubing manufacture, for instance the composition mentioned above, are of sufficient coherence to preclude the possibility of such an amount of longitudinal flow as would in any degree militate against a proper coalescing, compacting and fusing of the plastic anywhere along its length, except possibly at the extreme ends of the tube which ends are, of course, trimmed off in any case.

In practicing the present invention, the sheet P, as mentioned above, preferably contains an amount of stock substantially in excess of the amount necessary to fully fill and mold cavity 4 its full length and all about the mandrel. For example the sheet may contain about 5% excess of stock, as compared to the amount necessary to fill the die and provide a proper amount of stock in the tube; and this excess is preferably provided by excess thickness in the sheet, rather than by excess length. It is desirable, although not essential, that the opposed edges of the sheet P$^a$ and P$^b$ be cooperatively bevelled, as shown.

The die-halves are suitably heated, as by steam passed through passages 5, as will be understood. The pressure and temperature used are sufficient to cause the flowing of the stock; that is, not only a shifting of the stock, but, in particular a flowing together and coalescing of the stock, particularly at and near the edges P$^a$ and P$^b$. To this end a temperature of 100° to 120° C. and a pressure of about 3000 pounds per square inch giving approximately 500 pounds per square inch on the stock are desirable. (The pressure may be applied by a hydraulic press in which the die-halves are suitably mounted, one on the force plate, and the other on the chase.) As the closing of the die is completed, the stock flows longitudinally, adding to the length of the tube, it being understood that the volume of stock is selected proportional to the length of the die.

As will be understood by those skilled in the art, the flowing together of the edges and the making of a proper joint is influenced somewhat by the solvent content of the plastic but, as indicated above, about 6% is adequate. If desired, of course, the stock may be soaked in solvent, painted over-all, or at the edges P$^a$ and P$^b$, with pyroxylin solvent (or cement), or other expedients resorted to for facilitating the joining of the edges by high pressure and heat; although I have not found such expedients to be called for. If desired edges of the sheet may be cemented together forming an embryo tube prior to slipping the same over the mandrel.

The full coalescing of the edges having been accomplished, which will have satisfactorily occurred substantially as soon as the mold or die has closed and the above pressure and temperature have been attained, as will be understood by those skilled in the pyroxylin plastic art, the mold is cooled and the mandrel and tube removed. The mandrel is then removed and the tube seasoned to reduce the residual solvent to approximately 2%. If in the seasoning the tube shrinks unduly in diameter, or warps, it may be corrected by placing the tube in boiling water for a few minutes until it has softened somewhat, forcing a mandrel of proper size through the tube to size and straighten the tube, dipping the tube and mandrel in cold water, and then withdrawing the mandrel from the tube.

As will be evident, the size of the mold, the size of the mandrel used in the mold, and other factors of that character will vary with the particular tube to be produced. I may say that to provide for the finished tube being of proper size, making due allowance for seasoning and shrinkage, I have found it desirable to use a mandrel of the diameter desired for the finished hole in the tube, to use a die cavity sufficiently over-sized to give a tube wall as the tube comes from the die approximately 10% heavier than is desired in the finished tube. In making tubes of the usual length for fountain pens the die cavity may well be about 5/8" longer than the required length of the finished tube. It will be understood, of course, that the die-halves, desirably of steel, are carefully and accurately mated to give a close sliding fit therebetween, and that the telescoping halves of the die, and the mating die-cavity-halves therein, are of corresponding, e. g. equal, lengths. In order that radial flow of the stock shall be, for practical purposes, eliminated, it is important that the width of the wall as 6 (Fig. 4), be a minimum (e. g. 3/64") thus to give the wall substantially a knife edge, in order that the space 7 shall be of a size not offering opportunity for any substantial radial flow. The desired thickness of sheets to be used will, of course, depend on the wall thickness of the tube to be made. If desired the sheet may be thin and wrapped more than once about the mandrel.

While pyroxylin plastic has been particularly referred to, it will be understood that other thermoplastic material suitable for making tubing may be used, as other cellulose plastics, e. g. cellulose acetate and cellulose ether plastic.

I claim:

The process of making seamless tubing from sheet plastic material which process comprises: providing a sheet of plastic having a greater thickness than the radial capacity of the hereinafter named die-and-mandrel assembly when closed, supporting said sheet, with its opposed edges closely adjacent, about the mandrel of a die-and-mandrel assembly comprising a two-part radial-confining cylindrical die and a mandrel received therein, the longitudinally extending edges of the interiorally telescoping half of the die being in substantially knife edge form and the ends of the assembly being open to permit longitudinal flow of the stock during molding, and closing the die upon the sheet, under heat and pressure, thus to blend and coalesce the opposed edges of the sheet while the plastic is confined against radial flow and permitted longitudinal flow.

In testimony whereof, I affix my signature.

JOHN S. TAYLOR.